United States Patent
Xiang et al.

(10) Patent No.: US 11,377,747 B2
(45) Date of Patent: *Jul. 5, 2022

(54) SOLAR FUELS GENERATOR WITH PH SEPARATION

(71) Applicant: The California Institute of Technology, Pasadena, CA (US)

(72) Inventors: Chengxiang Xiang, San Marino, CA (US); Xinghao Zhou, Pasadena, CA (US); Ke Sun, Pasadena, CA (US); Ryan J. Jones, Pasadena, CA (US); Nathan S. Lewis, La Canada Flintridge, CA (US)

(73) Assignee: California Institute of Technology, Pasadena, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 16/994,842

(22) Filed: Aug. 17, 2020

(65) Prior Publication Data

US 2020/0378016 A1    Dec. 3, 2020

Related U.S. Application Data

(63) Continuation of application No. 15/909,764, filed on Mar. 1, 2018, now Pat. No. 10,787,749.

(60) Provisional application No. 62/465,556, filed on Mar. 1, 2017.

(51) Int. Cl.
| | |
|---|---|
| *B01D 61/44* | (2006.01) |
| *C25B 3/25* | (2021.01) |
| *C25B 13/08* | (2006.01) |
| *C25B 1/04* | (2021.01) |
| *C25B 1/55* | (2021.01) |
| *C25B 9/73* | (2021.01) |
| *C25B 11/075* | (2021.01) |

(52) U.S. Cl.
CPC ............. *C25B 3/25* (2021.01); *C25B 1/04* (2013.01); *C25B 1/55* (2021.01); *C25B 9/73* (2021.01); *C25B 11/075* (2021.01); *C25B 13/08* (2013.01); *Y02E 60/36* (2013.01)

(58) Field of Classification Search
CPC .... C25B 9/19; C25B 1/04; C25B 9/00; C25B 15/08; C25B 15/02; C25B 9/17; C25B 11/00; C25B 9/40; C25B 9/77; B01D 61/44; C02F 1/4695; C02F 2201/46115; Y02A 20/211
See application file for complete search history.

(56) References Cited

U.S. PATENT DOCUMENTS

| | | |
|---|---|---|
| 4,422,917 A | 12/1983 | Hayfield |
| 2007/0012579 A1 | 1/2007 | Rosvall et al. |

*Primary Examiner* — Zulmariam Mendez
(74) *Attorney, Agent, or Firm* — Gavrilovich, Dodd & Lindsey LLP

(57) ABSTRACT

A solar fuels generator includes an anolyte and a catholyte in contact with a separator. The separator is configured such that the pH of the anolyte and the pH of the catholyte are each held at a steady state pH level during operation of the solar fuels generator. The steady state pH level of the anolyte is different from the steady state pH level of the catholyte.

20 Claims, 5 Drawing Sheets

SOLAR FUELS GENERATOR WITH PH SEPARATION

CROSS REFERENCE TO RELATED APPLICATIONS

This Application is a continuation of U.S. application Ser. No. 15/909,764, filed Mar. 1, 2018, which application claims the benefit of U.S. Provisional Patent Application Ser. No. 62/465,556, filed on Mar. 1, 2017, and incorporated herein in its entirety.

STATEMENT REGARDING FEDERALLY SPONSORED RESEARCH

This invention was made with government support under Grant No. DE-5C0004993-T-112188 awarded by the Department of Energy. The government has certain rights in the invention.

FIELD OF THE INVENTION

The present invention relates to solar generators, and more particularly, to solar fuels generators.

BACKGROUND

Solar fuels generators create fuels through the use of paired half reactions. Examples half reactions are the oxygen evolution reaction (OER), hydrogen evolution reaction (HER), and the $CO_2R$ reduction reaction ($CO_2R$). One of the half reactions occurs in an anolyte and the other half reaction occurs in a catholyte. The anolyte and the catholyte are separated by a separator. The half reaction in the anolyte is often more efficient at a different pH than the half reaction in the catholyte. For instance, the $CO_2R$ reduction reaction ($CO_2R$) can be efficiently carried out in a neutral catholyte, the hydrogen evolution reaction (HER) can be efficiently carried out in an acidic catholyte, and the oxygen evolution reaction (OER) can be efficiently carried out in an alkaline anolyte. However, solar fuels generators generally operate with the anolyte and the catholyte at substantially the same pH. Accordingly, at least one or both the half reactions occur under inefficient conditions. As a result, there is a need for solar fuels generators that allow the half reactions to occur under efficient conditions.

SUMMARY

A solar fuels generator includes an anolyte in contact with a separator and a catholyte in contact with the separator. The pH of the anolyte and the pH of the catholyte are each held at a different steady state pH level during operation of the solar fuels generator. In some instances, the separator is constructed such that water dissociates in the separator during the operation of the solar fuels generator. In some instances, hydroxide anions enter the anolyte from the separator during operation of the solar fuels generator and protons enter catholyte from the separator during operation of the solar fuels generator.

Another embodiment of a solar fuels generator includes a first reactor configured to contain an anolyte in contact with a separator and a second reactor configured to contain a catholyte in contact with the separator. The separator is configured to keep the pH of the anolyte and the pH of the catholyte at a steady state pH level during operation of the solar fuels generator. The steady state pH level of the anolyte is different from the steady state pH level of the catholyte.

In some instances, a solar fuels generator includes an anolyte in contact with a separator and a catholyte in contact with the separator. The separator includes an anion exchange membrane and a cation exchange membrane arranged such that a component of the anolyte and/or the catholyte cannot travel across through the separator without traveling through both the anion exchange membrane and the cation exchange membrane.

DESCRIPTION

Figure 1:
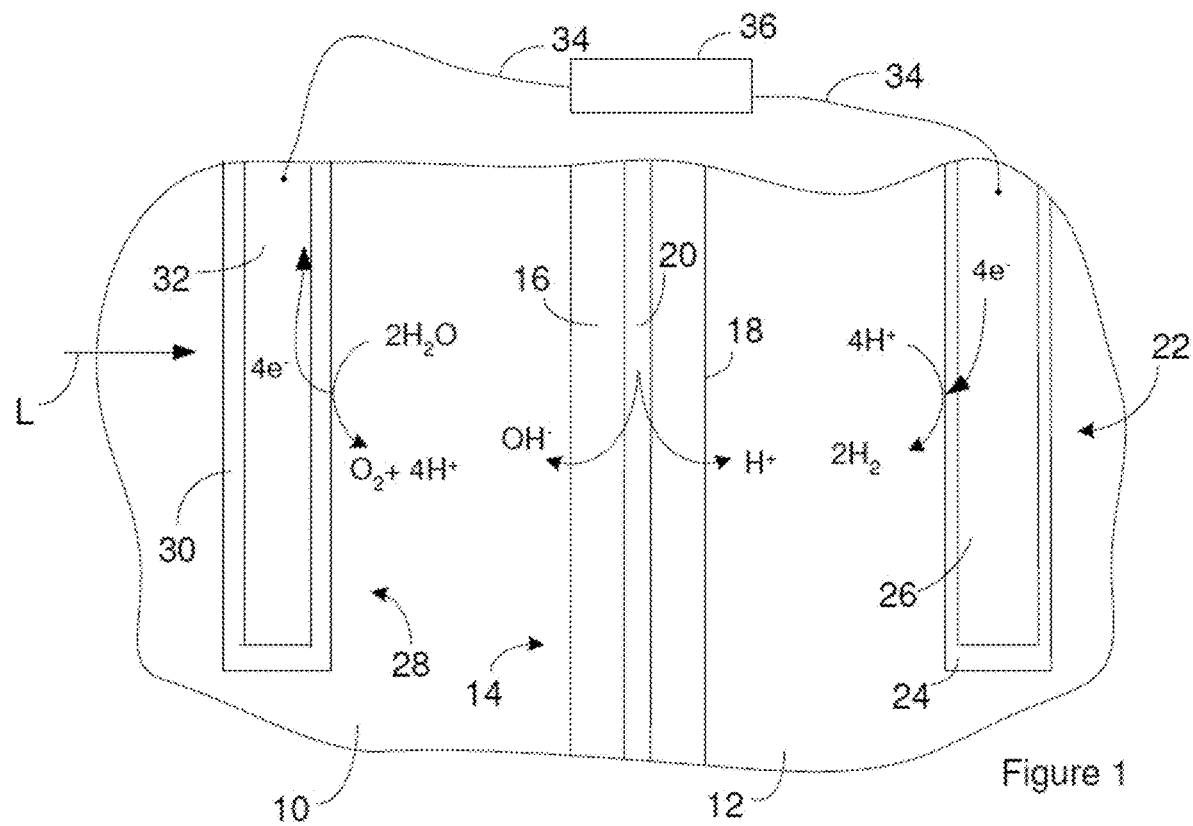
FIG. 1 is a diagram illustrating the active portion of a solar fuels generator.

As used herein and in the appended claims, the singular forms "a," "an," and "the" include plural referents unless the context clearly dictates otherwise. Thus, for example, reference to "a solar cell" includes a plurality of solar cells and reference to "the material" includes reference to one or more materials and equivalents thereof known to those skilled in the art, and so forth.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

Unless defined otherwise, all technical and scientific terms used herein have the same meaning as commonly understood to one of ordinary skill in the art to which this disclosure belongs. Although any methods and reagents similar or equivalent to those described herein can be used in the practice of the disclosed methods and compositions, the exemplary methods and materials are now described.

A solar fuels generator includes an anolyte and a catholyte in contact with a separator. The separator is configured such that the pH of the anolyte and the pH of the catholyte are each held at different steady state pH levels during operation of the solar fuels generator. The ability to operate the solar fuels generator with the anolyte and the catholyte at different pH levels allows the pH level of the anolyte to be selected so the half reaction occurring in that anolyte occurs under efficient conditions. Additionally, the pH level of the catholyte can be selected so the half reaction occurring in that catholyte occurs under efficient conditions even if the pH level selected for the anolyte is different from the pH level selected for the catholyte. For instance, in a solar fuels generator pairing an oxygen evolution reaction (OER) with a hydrogen evolution reaction (HER), the pH level of the anolyte where the OER occurs can be alkaline while the pH level of the catholyte where the HER occurs can be acidic.

Selecting different pH levels for the anolyte and the catholyte can improve the overall efficiency of the solar fuels generator. For instance, the inventors have achieved solar-to-fuel (STF) conversion efficiencies of around 10% when pairing an oxygen evolution half reaction (OER) with a hydrogen evolution half reaction (HER). The inventors have also been able to achieve solar-to-fuel (STF) conversion efficiencies of around 10% when pairing an oxygen evolution half reaction (OER) with a $CO_2R$ reduction half reaction that generates formate. Further, these solar-to-fuel (STF) conversion efficiencies have been achieved using only light as the bias source and without the use of an electrical bias source such as a battery. In contrast, prior solar fuels generators have achieved solar-to-fuel (STF) conversion efficiencies in the range of 4.6-6.5% when pairing the oxygen evolution half reaction (OER) and a $CO_2R$ reduction half reaction.

FIG. 1 illustrates the active portion of a solar fuels generator. The illustrated portion of the solar fuels generator includes an anolyte 10 and a catholyte 12 separated by a separator 14. The anolyte 10 can be a solid, liquid, gas, vapor, polymeric electrolytes or a combination thereof. The catholyte 12 can be a solid, liquid, gas, vapor, polymeric electrolytes, or a combination thereof. The anolyte 10 and catholyte 12 each contacts the separator 14. The separator 14 includes an anion exchange membrane 16 and a cation exchange membrane 18 arranged such that a component cannot travel between the anolyte 10 and the catholyte 12 through the separator 14 without traveling through both the anion exchange membrane 16 and the cation exchange membrane 18. A cation exchange membrane 18 is cationically conductive with limited conductivity for nonionic atoms or nonionic compounds, and close to zero conductivity for anions. An anion exchange membrane 16 is anionically conductive with limited conductivity for nonionic atoms or nonionic compounds, and close to zero conductivity fro cations. As a result, ions, nonionic atoms, and nonionic compounds from the anolyte 10 do not substantially travel across the separator 14 to the catholyte 12 and ions, nonionic atoms, and nonionic compounds from the catholyte 12 do not substantially travel across the separator 14 to the anolyte 10. Accordingly, protons do not readily travel between the anolyte 10 and the catholyte 12 allowing the anolyte 10 and catholyte 12 to be at substantially different pH levels.

FIG. 1 illustrates a catalyst layer 20 located between the anion exchange membrane 16 and the cation exchange membrane 18. The catalyst layer 20 is optional and the anion exchange membrane 16 can be in direct physical contact with the cation exchange membrane 18. For instance, the anion exchange membrane 16 can be laminated directly to the cation exchange membrane 18. When the separator 14 includes a catalyst layer 20, the catalyst layer 20 can include, consist of, or consist essentially of a catalyst such as a water dissociation catalyst or water self-ionization catalyst. Suitable water dissociation catalyst or water self-ionization catalysts include, but are not limited to, metal oxides and/or metal hydroxides such as TiOH, ZrOH, SiOH, polymeric materials such as poly(ferrocenyldimethysilane), poly(acrylamide), graphene and graphene oxides. Although FIG. 1 shows the catalyst included in a layer that is distinct from the anion exchange membrane 16 and the cation exchange membrane 18, the anion exchange membrane 16 and/or the cation exchange membrane 18 can include the catalyst. For instance, the catalyst can be embedded in the anion exchange membrane 16 and/or the cation exchange membrane 18. Alternately, the anion exchange membrane 16 and/or the cation exchange membrane 18 can impregnated or implanted with the catalyst.

Suitable anion exchange membranes 16 for use in the separator 14 include, but are not limited to, polyaromatic polymers, fluorinated polymers functionalized with sulfonic acid groups. An example of a suitable fluorinated polymer functionalized with sulfonic acid groups is sold under the trademark NAFION®. Suitable cation exchange membranes 18 for use in the separator 14 include, but are not limited to, polymeric materials functionalized with quaternary ammonium groups. An example of a suitable polymer functionalized with quaternary ammonium groups is sold under the trademark SELEMION®.

A suitable thickness for the anion exchange membrane 16 includes, but is not limited to, a thickness greater than 1 µm, 5 µm, or 10 µm and/or less than 500 µm, 1000 µm. A suitable thickness for the cation exchange membrane 18 includes, but is not limited to, a thickness greater than 1 µm, 5 µm, or 10 µm and/or less than 500 µm, 1000 µm. A suitable thickness for the catalyst layer 20 includes, but is not limited to, a thickness greater than 1 nm, or 2 nm and/or less than 10 µm, or 100 µm.

The illustrated portion of the solar fuels generator includes a cathode 22 that contacts the catholyte 12. The cathode 22 can include an optional cathode catalyst layer 24 on a cathode conductor 26. The cathode catalyst layer 24 can include one or more cathode catalysts selected to catalyze the half reaction that occurs at the cathode 22. Although the one or more cathode catalysts are shown as being included in a cathode catalyst layer 24, the one or more cathode catalysts can be included in the cathode conductor 26. Suitable cathode catalysts include, but are not limited to, reduction catalysts. When the half reaction at the cathode 22 is the hydrogen evolution reaction (HER), a suitable cathode catalyst includes, but is not limited to, Pt, Ni, NiPx, CoPx, NiMo, and combinations thereof. When the half reaction at the cathode 22 is a $CO_2R$ reaction, a suitable cathode catalyst includes, but is not limited to, Pd, Cu, Cu/Au, Ag, and combinations thereof.

The illustrated portion of the solar fuels generator includes an anode 28 that contacts the anolyte 10. The anode 28 can include an optional anode catalyst layer 30 on an anode conductor 32. The anode catalyst layer 30 can include one or more anode catalysts selected to catalyze the half reaction that occurs at the anode 28. Although the one or more anode catalysts are shown as being included in an anode catalyst layer 30, the one or more anode catalysts can be included in the anode conductor 32. Suitable anode catalysts include, but are not limited to, oxidation catalysts. When the half reaction at the anode 28 is the oxygen evolution reaction (OER), a suitable anode catalyst includes, but is not limited to, FeNiOx, IrOx, RuOx, CoOx and combinations thereof.

One or more electrical conductors 34 provide electrical communication between the anode 28 and the cathode 22. Suitable electrical conductors include, but are not limited to, metal wires, conductive polymers, conductive pastes and combinations thereof. An electrical pathway includes the anode 28, the one or more electrical conductors 34 and the cathode 22. FIG. 1 illustrates an external bias source 36 positioned along the electrical pathway so as to apply a bias between the cathode 22 and the anode 28. Suitable external bias sources 36 include, but are not limited to, batteries, fuel cells, and grid electricity. In some instances, the external bias source 36 is a photoelectrode that converts incident light into excited electron-hole pairs that drive a chemical reaction. The external bias source 36 is optional. For instance, in addition to the external bias source 36 or as an alternative to the external bias, the anode 28 and/or cathode 22 can be configured to act as a bias source. For instance, the anode 28 can be a photoanode 28 that converts incident light into excited electron-hole pairs that drive a chemical reaction and/or the cathode 22 can be a photocathode 22 that converts incident light into excited electron-hole pairs that drive a chemical reaction. The solar fuels generator is constructed to include one or more bias sources selected from the group consisting of the anode 28, the cathode 22, and the external bias source 36.

When the anode 28 is not photoactive, suitable anode conductors 32 include, but are not limited to, metals, metal alloys, metal phosphide and metal oxides such as Ni, Cu, Cu/Au, NiPx, CoPx, CoOx, and NiFeOx. When the anode 28 is or includes a photoanode 28, the anode conductor 32 can include or consist of a photoanode light absorber selected to absorb light at a wavelength to which the photoanodes 28 will be exposed during operation of the solar fuels generator. When the cathode 22 is not photoactive, suitable cathode conductors 26 include, but are not limited to, metals and metal oxides such as metals, metal alloys, metal phosphide and metal oxides such as Ni, Cu, Cu/Au, NiPx, CoPx, CoOx, NiFeOx. When the cathode 22 is or includes a photocathode 22, the cathode conductor 26 can include a photocathode light absorber selected to absorb light at a wavelength to which the photocathode 22 will be exposed during operation of the solar fuels generator. When the external bias source 36 is or includes a photoelectrode, the photoelectrode includes an external light absorber selected to absorb light at a wavelength to which the photocathode 22 will be exposed during operation of the solar fuels generator.

Suitable materials for the photoanode light absorbers, photocathode light absorbers, and external light absorbers include, but are not limited to, semiconductors. In some instances, the photoanode light absorbers include or consist of one or more semiconductors, the photocathode light absorbers include or consist of one or more semiconductors, and/or the external light absorbers include or consist of one or more semiconductors. Suitable semiconductors for the photoanode light absorbers include, but are not limited to, metal oxides, oxynitrides, sulfides, and phosphides that are stable in an oxidizing environment such as $WO_3$, $TiO_2$, and TaON. Suitable semiconductors for the photocathode light absorbers include, but are not limited to, p-type silicon, InP, $Cu_2O$, GaP, and $WSe_2$. Suitable semiconductors for the external light absorbers include, but are not limited to, Si, GaAs, CdTe, dopped indium gallium (di)selenide (CICS), and combinations thereof.

In some instances, the external light absorbers, the photoanode light absorbers and/or the photocathode light absorbers are doped. For instance, a photoanode light absorber can be an n-type semiconductor while the photocathode light absorber can be a p-type semiconductor. One or more pn junctions can also be present within one or more light absorbers selected from the group consisting of external light absorbers, photocathode light absorbers, and photoanode light absorber, and can be arranged so that electrons flow from the cathode 22 to a cathode catalyst and holes flow from the anode 28 to an anode catalyst.

The following discussion describes operation of a solar fuels generator constructed as shown in FIG. 1. For the purposes of this discussion, there is no external bias source 36 on the electrical pathway, the cathode 22 is not photoactive, and the anode 28 is a photoanode 28. During operation of the solar fuels generator, the anode 28 is illuminated as shown by the arrow labeled L in FIG. 1. The photoanode light absorber included in the anode 28 absorbs at least a portion of the incident light. The absorption of light within the photoanode light absorber excites hole-electron pairs within the photoanode light absorber. The position of an n-type photoanode light absorber in the anolyte 10 produces an electrical field that causes the holes to move to the surface of the photoanode light absorber and then the surface of the anode catalyst where the oxidation of the water in the first phase is catalyzed as shown in FIG. 1.

The electrical field at the anode 28 also causes the electrons that were excited in the anode 28 to move along the electrical pathway to the cathode catalyst where the electrons react with protons in the catholyte 12 to form hydrogen gas. The resulting hydrogen gas can be stored for use as hydrogen fuel.

The oxidation of the water generates gaseous oxygen and hydrogen cations ($H^+$, called protons below). Since the separator 14 includes an anion exchange membrane 16 and a cation exchange membrane 18, the anolyte 10 and catholyte 12 do not exchange protons across the separator 14. However, the anion exchange membrane 16 and/or cation exchange membrane 18 can be constructed with sufficient permeability for water to be present between or at an interface of the anion exchange membrane 16 and cation exchange membrane 18. An electrical potential between or at the interface of the anion exchange membrane 16 and cation exchange membrane 18 causes water to dissociate between or at the interface of the anion exchange membrane 16 and the cation exchange membrane 18. For instance, the water can dissociate where the anion exchange membrane 16 contacts the cation exchange membrane 18 or in the catalyst layer between the anion exchange membrane 16 and cation exchange membrane 18.

The water dissociation within the separator 14 generates hydroxide anions and protons in the interface of the anion exchange membrane 16 and the cation exchange membrane 18 and/or between the interface of the anion exchange membrane 16 and cation exchange membrane 18. The anion exchange membrane 16 is on the anolyte 10 side of the separator 14. As a result, the hydroxide anions can travel through the anion exchange membrane 16 to the anolyte 10 without traveling through the cation exchange membrane 18 as shown in FIG. 1. The hydroxide anions enter the anolyte 10 and combine with the protons from the anode 28 to form water. As a result, the protons generated from the anode 28 do not change or do not substantially change the pH of the anolyte 10 during operation of the solar fuels generator. Accordingly, the pH of the anolyte 10 remains stable during operation of the solar fuels generator.

The cation exchange membrane 18 is on the catholyte 12 side of the separator 14. As a result, the protons generated by the water dissociation travel through the cation exchange membrane 18 to the catholyte 12 without traveling through the anion exchange membrane 16 as shown in FIG. 1. The protons enter the catholyte 12 and replace the protons that are consumed in the generation of the hydrogen gas. Since the protons consumed at the cathode 22 are replaced by protons from the separator 14, the pH of the catholyte 12 does not change or does not substantially change during operation of the solar fuels generator. Accordingly, the pH of the catholyte 12 remains stable during operation of the solar fuels generator.

Since the pH of the anolyte 10 and the catholyte 12 remain stable during operation of the solar fuels generator, the pH level of the anolyte 10 and the catholyte 12 are each maintained at a steady state pH level during operation of the solar fuels generator. For instance, the pH of the anolyte 10 and the catholyte 12 can remain constant or substantially constant for at least 60 minutes, or 600 minutes during operation of the solar fuels generator. The steady state pH level of the anolyte 10 and catholyte 12 can be substantially different. For instance, the absolute value of the difference between the steady state pH level of the anolyte 10 and the steady state pH level of the catholyte 12 can be more than 0, or 2, and/or less than 14, or 15. In some instances, the steady state pH level of the catholyte 12 is less than the steady state pH level of the anolyte 10. In some instances, the steady state pH level of the catholyte 12 is less than 3, 7, or 15 and greater than or equal to zero while the steady state pH level of the anolyte 10 is greater than 0, 3, or 7 and less than 15. Selecting different steady state pH levels for the anolyte 10 and catholyte 12 so they are efficient for the half reaction occurring in the anolyte 10 and catholyte 12 can increase the efficiency of the solar fuels generator. For instance, the solar fuels generator can have a solar-to-fuel (STF) conversion efficiency greater than 7% or 9%, and/or less than 20%, or 100% for at least 1 hour, 10 hour, 100 hour, or 1000 hour during operation of the solar fuels generator. In some instances, the pH at which a half reaction occurs efficiently is a function of the catalyst for that half reaction. As a result, the steady state pH selected for an anolyte 10 and/or catholyte 12 can be function of the half reaction catalyst in addition or as an alternative to being a function of the half reaction.

The solar fuels generator of FIG. 1 is disclosed using the oxygen evolution reaction (OER) and the hydrogen evolution reaction (HER) as paired half reactions, however, the disclosed solar fuels generator can be used with other paired half reactions. For instance, the solar fuels generator can use the oxygen evolution reaction (OER) paired with the $CO_2R$ reduction reaction ($CO_2R$). Using the $CO_2R$ reduction reaction ($CO_2R$) can be used to generate other fuels that include hydrocarbons such as methane. Hydrocarbon fuels include or consists of carbon and hydrogen and may include or consist of carbon, hydrogen, and oxygen. The following generalized reaction can represent the overall reaction used when pairing the oxygen evolution reaction (OER) paired and the $CO_2R$ reduction reaction ($CO_2R$):

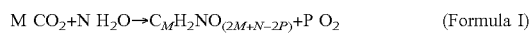

$$M\ CO_2 + N\ H_2O \rightarrow C_M H_2 NO_{(2M+N-2P)} + P\ O_2 \quad \text{(Formula I)}$$

where M, N, and P are non-negative numbers and, in some instances, are integers. $C_M H_2 NO_{(2M+N-2P)}$ represents the fuel produced in this reaction and $CO_2$ serves as the reactant included in the catholyte 12. Examples of the fuels that can be produced using this reaction in combination with the disclosed solar fuels generator include carbon monoxide, methanol, methane, ethanol, and formic acid. The following table 1 presents values for M, N and P that can be used to generate a particular fuel.

TABLE 1

| M | N | P | Fuel | Chemical Name |
|---|---|---|------|---------------|
| 1 | 2 | 2 | CH4 | Methane |
| 2 | 4 | 3 | 2 molecules of CH$_3$OH produced | Methanol |
| 2 | 2 | 1 | 2 molecules of HCOOH produced | Formic acid |
| 2 | 2 | 2 | CH$_3$COOH | Acetic Acid |
| 2 | 3 | 3 | C$_2$H$_6$O | Ethanol |
| 3 | 3 | 4 | CH$_3$CH$_2$COH | Propanol |
| 3 | 4 | 4 | HOCH$_2$CH$_2$CH$_2$OH | 1,3-Propanediol |
| 4 | 3 | 4 | CH$_3$CH$_2$COCOOH | 2-Oxybutyric acid |
| 4 | 5 | 6 | CH$_3$CH$_2$CH$_2$COH | Butanol |
| 6 | 6 | 6 | C$_6$H$_{12}$O$_6$ | Glucose |

The half reactions for each of the above fuels illustrate how the solar fuels cell generates a particular one of the hydrocarbon fuels in the above Table 1. For instance, when using the solar fuels cell to generate methanol, the half reaction at the anode, the half reaction at the cathode and the overall reaction are as follows:

$$3\ (H_2O(g) \rightarrow O_2(g) + 4H^+ + 4e^-)\ \text{(reaction at the anode 28)}$$

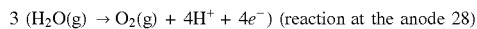

$$2\ (CO_2 + 6H^+ + 6e^- \rightarrow CH_3OH + H_2O)$$

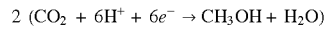

(reaction at the cathode 22)

$$4H_2O + 2CO_2 \rightarrow 2CH_3OH + 3O_2\ \text{(overall reaction)}.$$

Since the overall reaction is Formula I with M=N=P=6, these half reactions show the relationship between the overall reaction and the half reactions at the anodes and the cathodes. Additionally, the reaction at the anode is the same as the reaction disclosed in the context of FIG. 1. As a result, the primary chemical change needed to generate methanol instead of hydrogen is the delivery of $CO_2$ to the cathode as a reactant.

As is evident from Formula I, each of the hydrocarbon fuels generated through the use of Formula I is generated by including $CO_2$ in the catholyte as a reactant. It is believed that a particular one of the hydrocarbon fuels can be generated by controlling variables such as the proportions (or partial pressures) of the reactant, the temperature of the reaction, the voltages applied to the catalysts, and the chemical composition of the catalysts.

When the catholyte 12 includes a reactant, the cathode catalyst can catalyze the reaction at the cathode 22. For instance, when the catholyte 12 includes $CO_2$ as a reactant, a suitable cathode catalyst can include one or more components selected from the group consisting of copper (Cu), zinc (Zn), tin (Sn), nickel (Ni), platinum (Pt), palladium (Pd), rhodium (Rh), iridium (Ir), metal porphyrins and phthalocyanines. Other metals can also serve as a cathode catalyst when the catholyte 12 includes $CO_2$ as a reactant.

Figure 2A:
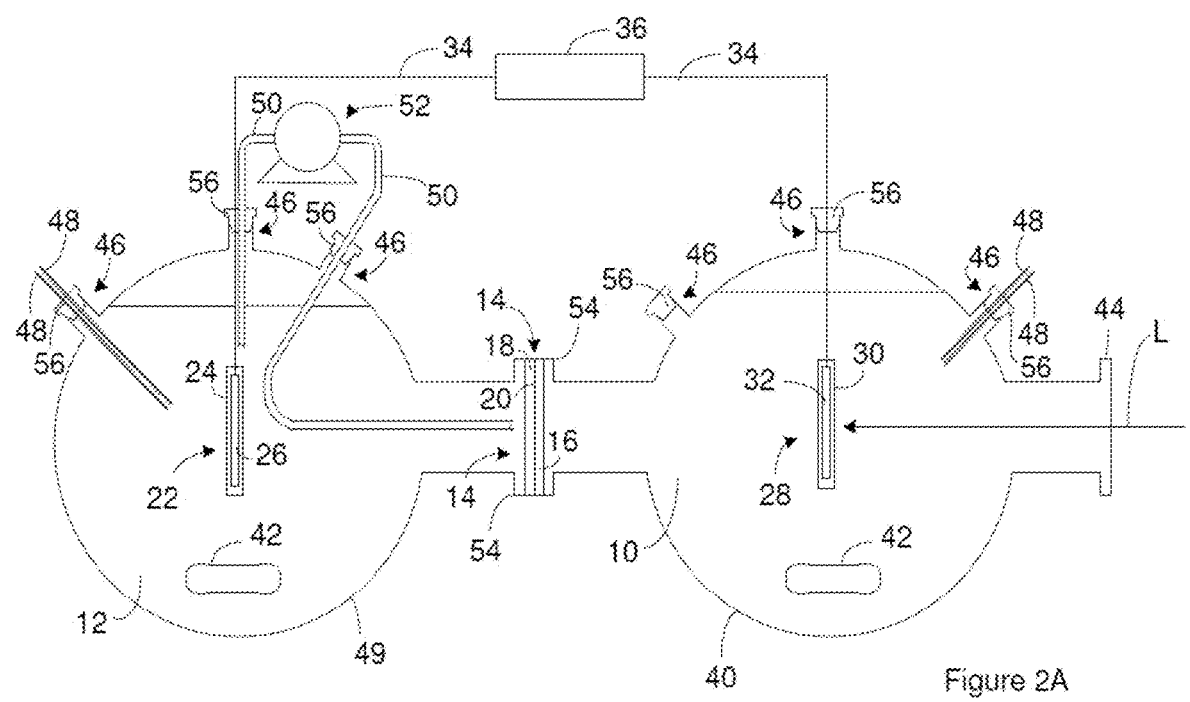
FIG. 2A is a cross-section of a solar fuels generator.

FIG. 2A illustrates a solar fuels generator having an active portion constructed according to a version FIG. 1 where the anode 28 is a photoanode 28 and the cathode 22 is not photoactive. The solar fuels generator includes an anolyte reservoir 40 that acts as a reactor for the half reaction at the anode 28. The anolyte reservoir 40 contains the anode 28, an anolyte 10, and an agitation mechanism 42 such as a stir bar. During operation of the solar fuels generator, the agitation mechanism 42 can be used to agitate and/or mix the components of the anolyte 10. The anolyte reservoir 40 includes an illumination port 44 through which light can enter the anolyte reservoir 40. The anode 28 is positioned such that light entering the anolyte reservoir 40 through the illumination port 44 can be incident on the anode 28. The anolyte reservoir 40 includes three other utility ports 46 that provide a pathway into the interior of the anolyte reservoir 40. Each of the utility ports 46 is sealed such that the contents of the anolyte reservoir 40 are not exposed to the ambient atmosphere. Suitable methods of sealing the utility ports 46 include, but are not limited to, conventional sealing devices 56 such as rubber stoppers. One or more conduits 48 extend through one of the sealing devices 56 into the interior of the anolyte reservoir 40. The one or more conduits 48 can be used to collect and/or analyze the anolyte 10 and/or the gas above the anolyte 10. One of the utility ports 46 is sealed. The electrical conductor 34 extends through another one of the sealing devices 56 and is electrically connected to the anode 28.

FIG. 2A shows the electrical conductor 34 connected to an external bias source 36. However, an external bias source 36 is optional as disclosed above.

The solar fuels generator includes a catholyte reservoir 49 that acts as a reactor for the half reaction at the cathode 22. The catholyte reservoir 49 contains a cathode 22 that is not photoactive, a catholyte 12, and an agitation mechanism 42 such as a stir bar. The catholyte reservoir 49 includes three utility ports 46 that each provides a pathway into the interior of the anolyte reservoir 40. Each of the utility ports 46 is sealed such that the contents of the anolyte reservoir 40 are exposed to the ambient atmosphere. Suitable methods of sealing the utility ports 46 include, but are not limited to, conventional sealing devices 56 such as rubber stoppers. One or more conduits 48 extend through one of the sealing devices 56 into the interior of the anolyte reservoir 40. The conduits 48 can be used to collect and/or analyze the catholyte 12 and/or gas above the catholyte 12. In some instances, one or more of the conduits 48 can be used to deliver a reactant into the catholyte 12. For instance, when the half reaction in the catholyte 12 is the $CO_2R$ reduction reaction ($CO_2R$), one or more of the conduits 48 can be used to deliver $CO_2$ to the catholyte 12. The electrical conductor 34 extends through another one of the sealing devices 56 and is electrically connected to the cathode 22.

The catholyte reservoir 49 includes a re-circulation system. The re-circulation system includes two or more re-circulation conduits 50 arranged such that at least two of the re-circulation conduits 50 extend through one or more of the utility ports 46 on the catholyte reservoir 49. For instance, FIG. 2A shows two of the re-circulation conduits 50 that each extends through a different one of the utility ports 46. The re-circulation conduits 50 are in liquid communication with a pump 52. The pump 52 can be used to re-circulate the catholyte 12 from the catholyte reservoir 49 back into the catholyte reservoir 49. An end of one or more fluid conduits 48 can be placed near a surface of an electrode and/or a surface of a separator 14. For instance, FIG. 2A illustrates an end of a fluid conduit 48 placed near the surface of the separator 14. The location of the end of the fluid conduit 48 near a surface can reduce formation and/or retention of gas bubbles on the surface. For instance, a flow of the catholyte 12 onto and/or across the surface of the separator 14 can remove gas bubbles from the surface of the separator 14 through mechanisms such as forced convective flux.

The catholyte reservoir 49 and the anolyte reservoir 40 each includes a separator port 54. The separator 14 is held between the separator port 54 of the catholyte reservoir 49 and the separator port 54 of the anolyte reservoir 40 such that the anolyte 10 and the catholyte 12 are each in contact with the separator 14.

Figure 2B:
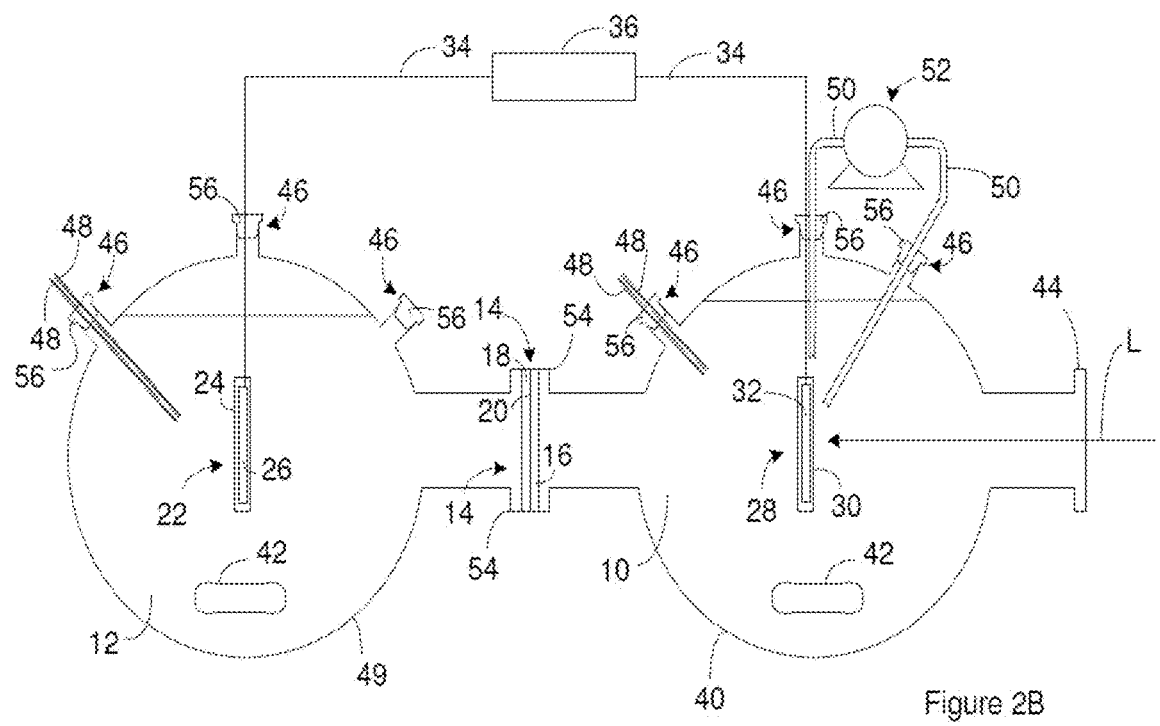
FIG. 2B is a cross-section of another embodiment of a solar fuels generator.

Although FIG. 2A illustrates the re-circulation system operating with the catholyte reservoir 49, a re-circulation system can be used with the anolyte reservoir. For instance, FIG. 2B illustrates the solar fuels generator of FIG. 2A modified to include a re-circulation system that re-circulates the anolyte 10. As noted above, an end of one or more fluid conduits 48 can be placed near a surface of an electrode and/or a surface of a separator 14. Accordingly, FIG. 2B illustrates an end of a fluid conduit 48 placed near the surface of the anode 28. As noted, the locating the end of the fluid conduit 48 near the surface of the anode 28 can reduce formation and/or retention of gas bubbles on the surface of the anode 28. A suitable distance for an end of a fluid conduit 48 near a surface of an electrode and/or a separator 14 includes a distance less than 10 cm, 5 cm, or 2 cm and/or greater than 1 mm, 5 mm, or 10 mm.

The solar fuels generator can include more than one re-circulation system. For instance, a first re-circulation system can be used with the catholyte reservoir 49 and a second re-circulation system can be used with the anolyte reservoir. Alternately, both the catholyte reservoir 49 and anolyte reservoir can exclude a re-circulation system.

Figure 2C:
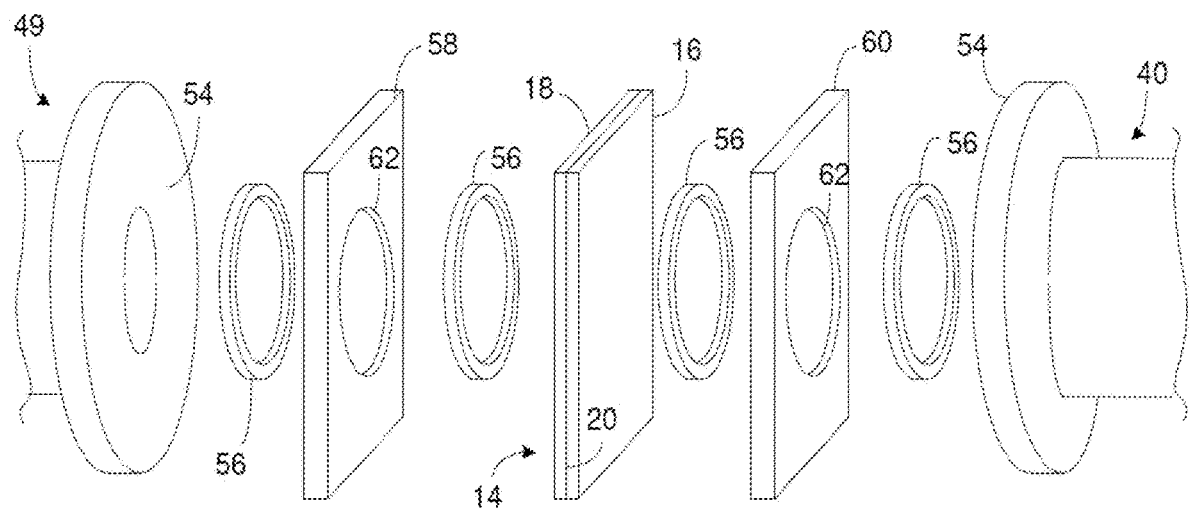
FIG. 2C is a perspective drawing of an exploded view of an interface between a separator, a catholyte reservoir and a anolyte reservoir that is suitable for use in the solar fuels generator of FIG. 2A and/or FIG. 2B.

In FIG. 2A and FIG. 2B, the interface between the separator 14, the catholyte reservoir 49 and the anolyte reservoir 40 is constructed such that the separator 14, the anolyte 10, and the catholyte 12 are not exposed to the ambient atmosphere. For instance, FIG. 2C illustrates one possible construction of the interface between the separator 14, the catholyte reservoir 49 and the anolyte reservoir 40. The interface includes multiple sealing devices 56 such as o-rings located between different interface components. For instance, a sealing device 56 is located between a flange of the catholyte reservoir 49 and a first separator support 58. A sealing member is also between the first separator support 58 and the separator 14. Another sealing member is between the separator 14 and a second separator support 60. Another sealing member is also between the second separator support 60 and a flange of the anolyte reservoir 40. Suitable second separator supports 60 and first separator supports 58 include but are not limited to, metal substrates, rubber, Teflon, and glass.

The interface is formed by clamping the flange of the anolyte reservoir 40 to the flange of the catholyte reservoir 49 with the components of the interface between the flange of the anolyte reservoir 40 and the flange of the catholyte reservoir 49. When the interface is assembled, the separator 14 is located between the first separator support 58 and the second separator support 60. An opening 62 extends through the first separator support 58 and the anolyte 10 can contact the separator 14 through the opening 62 in the first separator support 58. An opening 62 extends through the second separator support 60 and the catholyte 12 can contact the separator 14 through the opening 62 in the second separator support 60.

Figure 3A:
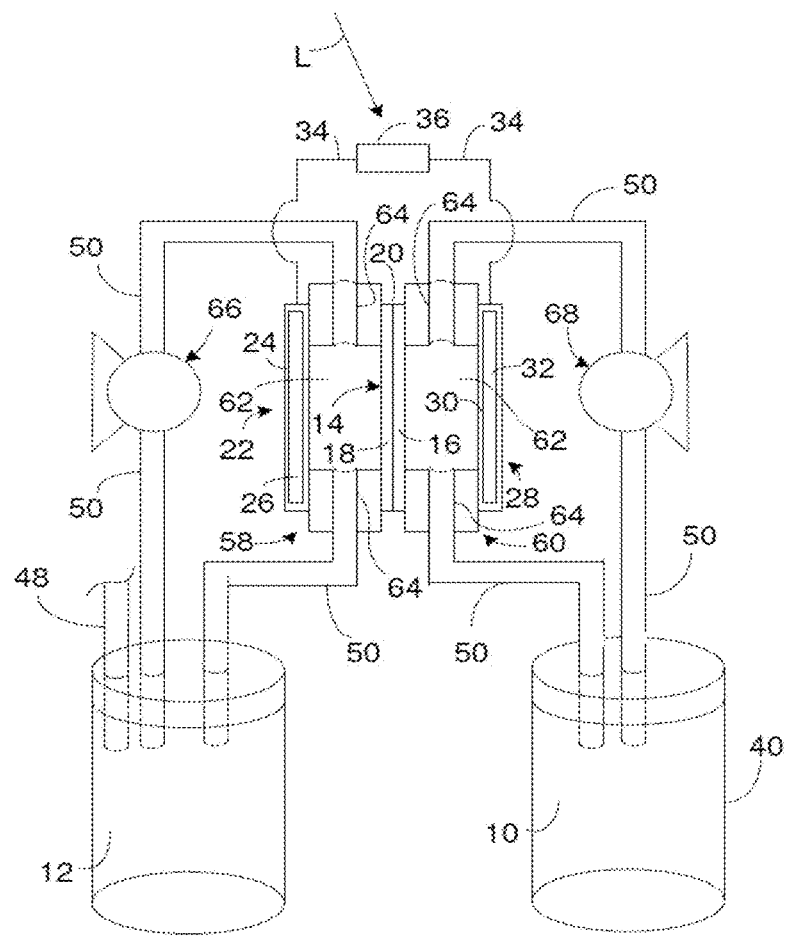
FIG. 3A is a schematic diagram of a solar fuels generator.

FIG. 3A illustrates another embodiment of a solar fuels generator having an active portion constructed according to FIG. 1. In this embodiment, the interface between the separator 14, the catholyte reservoir 49 and the anolyte reservoir 40 are moved outside of the reservoirs. For instance, rather than the interface being clamped between the reservoirs, the electrodes are moved outside of the interface and over the openings 62 in the separator supports 58. More particularly, the anode 28 is positioned over the opening 62 through the first separator support 58 and the cathode 22 is positioned over the opening 62 through the second separator support 60.

Lumens 64 extend through the first separator support 58 to the opening 62 through the first separator support 58. A cathode 22 re-circulation system includes a catholyte pump 66 and fluid conduits 48 that are configured to re-circulate the catholyte 12 from a catholyte reservoir 49, through one of the lumens 64 into the opening 62 in the first separator support 58, out another of the lumens 64 and back to the catholyte reservoir 49. During operation of the solar fuels generator, the catholyte 12 contacts the separator 14 and the cathode 22 when passing through the opening 62 in the first separator support 58. Accordingly, the opening 62 in the first separator support 58 effectively serves as a reactor for the half reaction at the cathode 22.

Lumens 64 extend through the second separator support 60 to the opening 62 through the second separator support 60. An anode 28 re-circulation system includes an anolyte pump 68 and fluid conduits 48 that are configured to re-circulate the anolyte 10 from an anolyte reservoir, through one of the lumens 64 into the opening 62 in the second separator support 60, out another of the lumens 64 and back to the anolyte reservoir. During operation of the solar fuels generator, the anolyte 10 contacts the separator 14 and the anode 28 when passing through the opening 62 in the second separator support 60. Accordingly, the opening 62 in the first separator support 58 effectively serves as a reactor for the half reaction at the anode 28.

One or more conduits 48 extend through the catholyte reservoir 49 into the interior of the catholyte reservoir 49. The conduits 48 can be used to collect and/or analyze the catholyte 12 and/or gas above the catholyte 12. In some instances, one or more of the conduits 48 can be used to deliver a reactant into the catholyte 12. For instance, when the half reaction in the catholyte 12 is the $CO_2R$ reduction reaction ($CO_2R$), one or more of the conduits 48 can be used to deliver $CO_2$ to the catholyte 12.

Figure 3B:
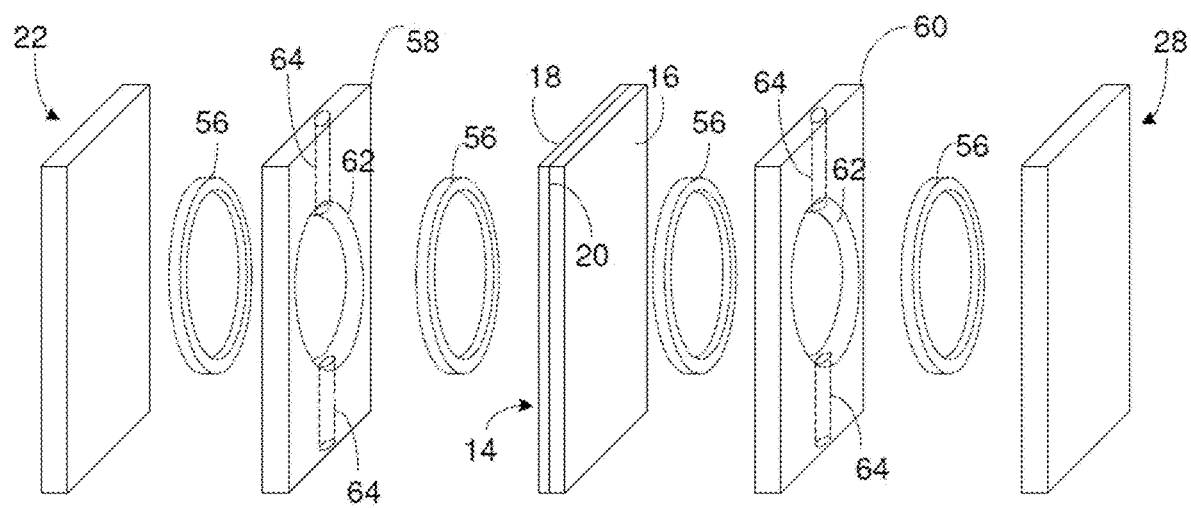
FIG. 3B is a perspective drawing of an exploded view of an interface between a separator, cathode and anode that is suitable for use in the solar fuels generator of FIG. 3A.

FIG. 3B illustrates a possible construction of the interface between the separator 14, cathode 22 and the anode 28 as shown in FIG. 3A. The interface includes multiple sealing devices 56 such as o-rings located between different interface components. For instance, a sealing device 56 is located between the cathode 22 and a first separator support 58. A sealing member is also between the first separator support 58 and the separator 14. Another sealing member is between the separator 14 and a second separator support 60. Another sealing member is also between the second separator support 60 and the anode 28. The interface is formed by clamping the components of the interface together. When the interface is assembled, the separator 14 is located between the first separator support 58 and the second separator support 60.

Although FIG. 1 through FIG. 3B are disclosed in the context of the anode 28 being a photoanode 28, the cathode 22 can be a photocathode 22 in addition or as an alternative to the anode 28 being a photoanode 28. When the cathode 22 is a photocathode 22, the absorption of light by the photocathode light absorber generates hole-electron pairs within the photocathode light absorber. The presence of a p-type photocathode light absorber in the catholyte 12 produces an electrical field that causes the electrons within the photocathode light absorber to move to the surface of the cathode 22 light absorber and then the surface of the cathode catalyst where they react with the protons to form hydrogen gas. The holes generated in the photocathode light absorber move from the photocathode light absorber, along the electrical pathway to the photoanode light absorber as a result of the electrical field.

Although FIG. 1 through FIG. 3B are disclosed in the context of the anode 28 being a photoanode 28, the external bias source 36 can be a photoelectrode in addition or as an alternative to the anode 28 being a photoanode 28. When the external bias source 36 is a photoelectrode, the absorption of light by the photocathode light absorber excites hole-electron pairs within the external light absorber. The photoexcited electrons and holes in the external light abosrber produce an electrical field that causes the electrons within the external light absorber to move along the electrical pathway toward the cathode 22 and the holes within the external light absorber to move along the electrical pathway toward the anode 28.

The separator disclosed above can be used in conjunction with other solar fuels generator constructions in order to improve pH conditions in the anolyte and catholyte. For instance, the separator can replace the separator in solar fuels generators having electrodes that are attached directly to a separator and/or are immobilized relative to the separator as disclosed in U.S. patent application Ser. No. 12/176,065, filed on Jul. 18, 2008, now U.S. Pat. No. 8,110,898; and U.S. patent application Ser. No. 12/956,422, filed on Nov. 30, 2010, now U.S. Pat. No. 9,530,912; and U.S. patent application Ser. No. 13/855,515, filed on Apr. 2, 2013, now U.S. Pat. No. 9,476,129; each of which is incorporated herein in its entirety.

EXAMPLES

Example 1

A solar fuels generator was constructed according to FIG. 2B and FIG. 2C. The solar fuels generator was configured to generate hydrogen gas at the cathode by the hydrogen evolution reaction (HER) and oxygen gas at the anode by the oxygen (OER).

The catholyte was aqueous $H_2SO_4$ with pH=0 (J.T. Baker, ACS 88%). The anolyte was a 0.5M potassium borate (KBi) solution with pH=9.3 prepared using a 0.5 M KOH (aq.) solution made from potassium hydroxide pellets (KOH, Macron Chemicals, ACS 88%) and a 1 M boric acid ($H_3BO_3$, Sigma Aldrich, BioReagent>99.5%) aqueous solution.

The cathode was not photoactive and included a Pt mesh or a Ti mesh as the cathode conductor. The cathode had a cathode catalyst layer coated on the cathode conductor. The cathode catalyst layer included CoP as a cathode catalyst selected to catalyze the hydrogen evolution reaction (HER).

The anode was photoactive with an anode conductor that included a tandem-junction photoabsorber. The photoabsorber included planar GaAs layers contacting planar InGaP layer. The planar layers were grown epitaxially by metal organic chemical-vapor deposition (MOCVD) on an $n^+$-GaAs wafer that had a (100)-oriented polished surface. The anode conductor also included an amorphous hole-conductive protection layer. The protection layer was a 62.5 nm thick layer of $TiO_2$ grown on the exposed InGaP by atomic-layer deposition at 150° C. with tetrakis (dimethylamido) titanium and water as precursors. A optically transparent layer of Ni metal (~2 nm thick) was RF sputter deposited (AJA International) onto the exposed $TiO_2$ surface at 130 W with a constant deposition rate of ~0.1 A/s at a constant working pressure of 5 mTorr maintained by an Ar flow rate of 10 sccm. The layer of Ni metal provided an ohmic contact to the anolyte. Additionally, the layer of Ni metal served as the anode catalyst layer with the Ni serving as an anode catalyst selected to catalyze the oxygen evolution reaction (OER). The anode had an area of 1.06 cm² that was illuminated during operation of the solar fuels generator. The anode was electrically connected directly to the cathode without a bias source being present along the electrical pathway between the anode and cathode.

The separator included 100 micrometers of Nafion as the cation exchange membrane in contact with 100 micrometer of Selemion as an anion exchange membrane. The bipolar separator did not include a catalyst layer. The separator was cut into 3×3 cm pieces and thoroughly rinsed with deionized water before use.

The anolyte reservoir and the catholyte reservoir 49 both included stir bars for agitating the anolyte and catholyte during operation of the solar fuels generator. The anolyte reservoir included a re-circulation system. The re-circulation system included a peristaltic pump system (Simply Pumps PM300F) with a minimal flow rate of ~500 mL/min controlled by a tunable power supply. The re-circulation system included curved glass tubing as the fluid conduits. The curved glass tubing was connected to the pump by polyimide tubing. An end of the curved glass tubing was placed close to the surface of the anode to facilitate removal of the bubbles from the surface of the anode and to reduce dissolution of the Ni anode catalyst at near-neutral pH conditions.

The solar fuels generator was operated by re-circulating the anolyte while illuminating the anode with a halogen lamp at 1 sun for over 100 hours. Additionally, the catholyte and anolyte were stirred using stir bars. During operation of the solar fuels generator, the pH of the bulk anolyte was monitored and was maintained at a steady state of pH=0. During operation of the solar fuels generator, the pH of the bulk catholyte was monitored and was maintained at a steady state of pH=9.3.

Figure 4A:
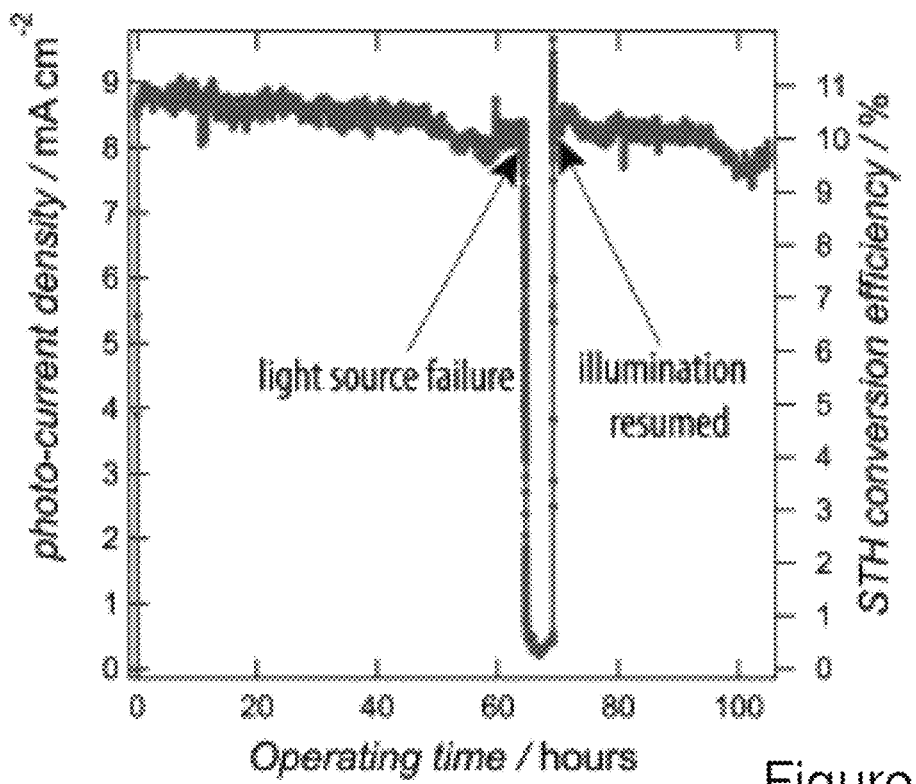
FIG. 4A shows current density versus time for a solar fuels generator constructed according to FIG. 2B.

The current density was monitored during operation of the solar fuels generator and the results are presented in FIG. 4A. The halogen lamp failed at about 70 hours of operation and illumination was resumed at about 5 hours later. The right side of FIG. 4A shows the solar-to-fuel (STF) conversion efficiency (solar-to-hydrogen (STH) conversion efficiency). The solar fuels generator maintained a STH conversion efficiency above 8% and even above 9% for more than 100 hours.

Figure 4B:
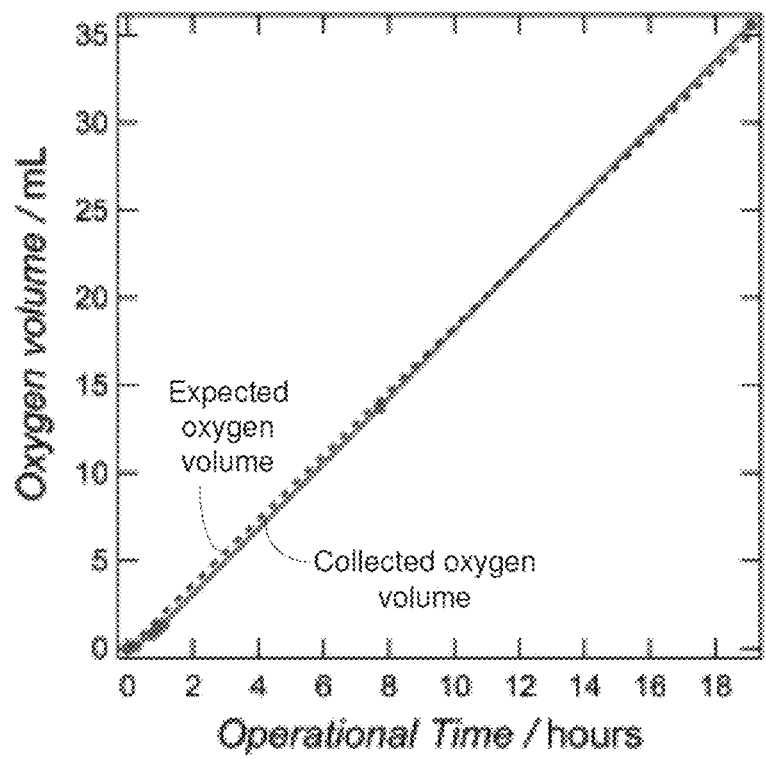
FIG. 4B shows collected oxygen volume versus time for a solar fuels generator constructed according to FIG. 2B.

The volume of oxygen produced as a function of time was determined by gas collection measurements. The results are presented in FIG. 4B. Additionally, FIG. 4B shows the volume of oxygen that would be produced based on the current passed as a function of time assuming 100% Faradic efficiency for oxygen evolution. A near Faradic efficiency of oxygen production at the anode was observed over the course of ~20 hours of continuous operation suggesting minimal corrosion of the anode under these conditions.

Example 2

A solar fuels generator was constructed according to FIG. 2A and FIG. 2C. The solar fuels generator was configured to generate formate gas at the cathode by the $CO_2R$ reduction reaction ($CO_2R$) and oxygen gas at the anode by the oxygen (OER).

The catholyte was aqueous 2.8M $KHCO_3$ with pH=8.0 saturated with a stream of $CO_2$ at 1 atm. The catholyte was prepared by vigorously bubbling $CO_2$ (g) through $K_2CO_3$ solutions until the pH did not change. The anolyte was a 1.0M KOH solution with pH=13.7 prepared from potassium hydroxide pellets.

The cathode was not photoactive and included a Ti mesh as the cathode conductor coated with a Pd/C nanoparticle coating (Pd mass loading of 250 μg/cm²) as the cathode catalyst layer. The cathodes were fabricated by drop-casting a solution containing 2 mg/mL Pd/C nanoparticles and ~0.15 wt % Nafion in isopropanol on the Ti mesh. The cathodes had a geometric area of about 0.040 cm².

The anode was the photoactive anode of Example 1. The anode had an area of 0.03 cm² that was illuminated during operation of the solar fuels generator. The anode was electrically connected directly to the cathode without a bias source being present along the electrical pathway between the anode and cathode.

The separator included 100 micrometers of Nafion as the cation exchange membrane in contact with 100 micrometer of Selemion as an anion exchange membrane. The bipolar separator did not include a catalyst layer. The separator was cut into 1.5×1.5 cm pieces and thoroughly rinsed with deionized water before use.

The anolyte reservoir and the catholyte reservoir 49 both included stir bars for agitating the anolyte and catholyte during operation of the solar fuels generator. The catholyte reservoir 49 included a re-circulation system. The re-circulation system included a peristaltic pump system (Simply Pumps PM300F) with a minimal flow rate of ~500 mL/min controlled by a tunable power supply. The re-circulation system included curved glass tubing as the fluid conduits. The curved glass tubing was connected to the pump by polyimide tubing. An end of the curved glass tubing was placed close to the surface of the separator to facilitate removal of $CO_2$ bubbles from the surface of the separator and accordingly to reduce voltage loss caused by the bubbles and/or fluctuations in the current and voltage.

The solar fuels generator was operated by re-circulating the anolyte while illuminating the anode at 100 mW/cm² of simulated AM1.5 illumination. Additionally, the catholyte and anolyte were stirred using stir bars. During operation of the solar fuels generator, the pH of the bulk anolyte was monitored and was maintained at a steady state of pH=13.7. During operation of the solar fuels generator, the pH of the bulk catholyte was monitored and was maintained at a steady state of pH=8.0.

Figure 5:
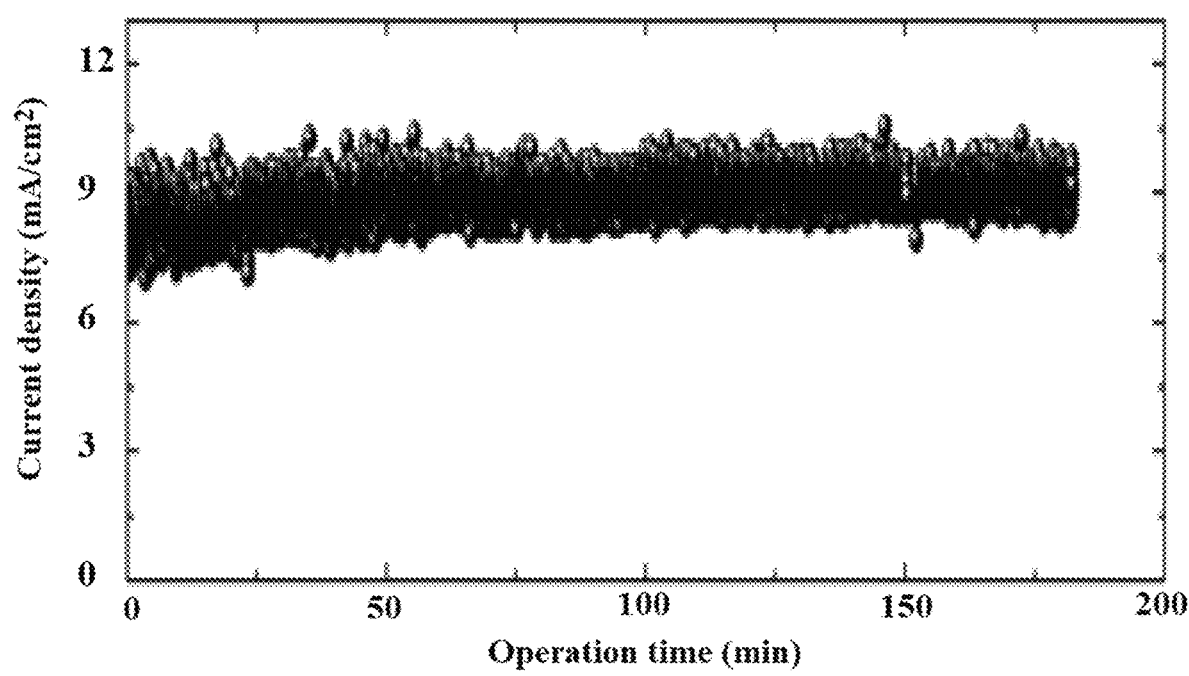
FIG. 5 shows current density versus time for a solar fuels generator constructed according to FIG. 2A.

The current density was monitored during operation of the solar fuels generator and the results are presented in FIG. 5. The photocurrent density was 8.7 +/−0.5 mA/cm². Accordingly, the solar fuels generator maintained an average current density above 7 mA/cm² or even 8 7 mA/cm² for more than 150 minutes of operation time. Additionally, stability tests were performed showing that the Faradic efficiency of $CO_2$ reduction to formate was about ~100%, 98%, 95%, and 94% after 30 minutes, 1 hour, 2 hours, and 3 hours respectively. The corresponding solar to the solar-to-fuel (STF) conversion efficiency (solar-to-formate conversion efficiency) at these times was about 10.5%, 10.3%, 10.0%, and 9.9% respectively.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A solar fuels generator, comprising:
an anolyte reservoir;
a catholyte reservoir,
a anode in the anolyte reservoir,
a photocathode in the catholyte reservoir,
a separator between the anolyte reservoir and catholyte reservoir,
an anolyte in the anolyte reservoir in contact with the separator and the anode, and
a catholyte in the catholyte reservoir in contact with the separator and the photocathode,
a pH of the anolyte being at a steady state pH level during operation of the solar fuels generator and a pH of the catholyte being at a steady state pH level during operation of the solar fuels generator, and
the steady state pH level of the anolyte being different from the steady state pH level of the catholyte.

2. The generator of claim 1, wherein water dissociates in the separator during the operation of the solar fuels generator.

3. The generator of claim 1, wherein hydroxide anions enter the anolyte from the separator during operation of the solar fuels generator and protons enter catholyte from the separator during operation of the solar fuels generator.

4. The generator of claim 1, wherein the solar fuels generator provides a solar-to-fuel (STF) conversion efficiency above 9% during operation of the solar fuels generator.

5. The generator of claim 1, wherein an absolute value of a difference between the steady state pH level of the anolyte and the steady state pH level of the catholyte is more than 5.

6. The generator of claim 1, wherein the separator includes an anion exchange membrane and a cation exchange membrane arranged such that a component of the anolyte and/or the catholyte cannot travel across the separator without traveling through both the anion exchange membrane and the cation exchange membrane.

7. The generator of claim 6, wherein the anion exchange membrane includes a polymer functionalized with quaternary ammonium groups and the cation exchange membrane includes a material selected from the group consisting of polyaromatic polymers and fluorinated polymers functionalized with sulfonic acid groups.

8. The generator of claim 6, wherein a catalyst is positioned between the anion exchange membrane and the cation exchange membrane.

9. The generator of claim 8, wherein the catalyst is selected to catalyze water dissociation.

10. The generator of claim 8, wherein the catalyst is selected from the group consisting of TiOH, ZrOH, SiOH, poly(ferrocenyldimethysilane), poly(acrylamide), graphene and graphene oxide.

11. A solar fuels generator, comprising:
a first reactor configured to contain an anolyte in contact with a separator and an anode and a second reactor configured to contain a catholyte in contact with the separator and a photocathode, and
the separator includes an anion exchange membrane and a cation exchange membrane arranged such that a component of the anolyte and/or the catholyte cannot travel across through the separator without traveling through both the anion exchange membrane and the cation exchange membrane.

12. A solar fuels generator, comprising:
a first reactor configured to contain an anolyte in contact with a separator and an anode and a second reactor configured to contain a catholyte in contact with the separator and a photocathode,
the separator being configured to keep a pH of the anolyte at a steady state pH level during operation of the solar fuels generator and to keep a pH of the anolyte at a steady state pH level during operation of the solar fuels generator, and
the steady state pH level of the anolyte being different from the steady state pH level of the catholyte.

13. The generator of claim 12, wherein the separator is configured such that water dissociates inside of the separator during the operation of the solar fuels generator.

14. The generator of claim 12, wherein the separator is configured such that hydroxide anions enter the anolyte from the separator during operation of the solar fuels generator and protons enter catholyte from the separator during operation of the solar fuels generator.

15. The generator of claim 12, wherein an absolute value of a difference between the steady state pH level of the anolyte being and the different from the steady state pH level of the catholyte is more than 5.

16. The generator of claim 12, wherein the separator includes an anion exchange membrane and a cation exchange membrane arranged such that a component of the anolyte and/or the catholyte cannot travel across through the separator without traveling through both the anion exchange membrane and the cation exchange membrane.

17. The generator of claim 16, wherein the anion exchange membrane includes a polymer functionalized with quaternary ammonium groups and the cation exchange membrane includes a material selected from the group consisting of polyaromatic polymers and fluorinated polymers functionalized with sulfonic acid groups.

18. The generator of claim 16, wherein a catalyst is positioned between the anion exchange membrane and the cation exchange membrane.

19. The generator of claim 18, wherein the catalyst is selected to catalyze water dissociation.

20. The generator of claim 18, wherein the catalyst is selected from the group consisting of TiOH, ZrOH, SiOH, poly(ferrocenyldimethysilane), poly(acrylamide), graphene and graphene oxide.

* * * * *